United States Patent [19]

Riegel et al.

[11] 3,879,480

[45] Apr. 22, 1975

[54] VINYL CHLORIDE PROCESS

[75] Inventors: Herbert Riegel, Maplewood, N.J.; Harvey D. Schindler, New York, N.Y.

[73] Assignee: The Lummus Company, Bloomfield, N.J.

[22] Filed: Nov. 23, 1970

[21] Appl. No.: 92,126

Related U.S. Application Data

[63] Continuation-in-part of Ser. No. 688,724, Dec. 7, 1967.

[52] U.S. Cl................... 260/656 R; 23/260; 23/283
[51] Int. Cl............................................ C27c 21/02
[58] Field of Search..................... 260/656 R, 659 A

[56] References Cited
UNITED STATES PATENTS

| | | | |
|---|---|---|---|
| 2,140,547 | 12/1938 | Reilly................................ | 260/656 |
| 2,407,828 | 9/1946 | Gorin................................. | 260/659 |
| 2,838,577 | 6/1958 | Cook et al. ........................ | 260/656 |
| 3,291,846 | 12/1966 | Otsika et al........................ | 260/656 |
| 3,501,539 | 3/1970 | Olson et al........................ | 260/656 |

FOREIGN PATENTS OR APPLICATIONS

| 705,925 | 3/1965 | Canada.............................. | 260/659 |
|---|---|---|---|

*Primary Examiner*—Leon Zitver
*Assistant Examiner*—A. Siegel
*Attorney, Agent, or Firm*—Marn & Jangarathis

[57] ABSTRACT

A process and reactor for producing vinyl chloride by contacting a gaseous feed containing ethane and/or ethylene, hydrogen chloride and/or chlorine with a molten copper chloride salt. The copper chloride salt is oxidized in the upper portion of the reactor, passed to an intermediate portion of the reactor wherein the melt is contacted with the feed gas to produce vinyl chloride and passed to the bottom portion of the reactor wherein the melt is contacted with dichloroethane to produce additional vinyl chloride. The melt is circulated from the bottom to the top of the reactor by an inert lift gas, the temperature of which may be suitably regulated to control the temperature of the melt. The reactor is provided with suitable seals which permit melt to flow from one portion to another and prevent gases from flowing from one portion to another.

14 Claims, 2 Drawing Figures

INVENTORS
Herbert Riegel
Harvey D. Schindler

BY

Marn & Jangarathis

INVENTORS
Herbert Riegel
Harvey D. Schindler

BY

Marn & Jangarathis

VINYL CHLORIDE PROCESS

This application is a continuation-in-part of application Ser. No. 688,724 filed on Dec. 7, 1967.

This invention relates to the production of vinyl chloride. More particularly, this invention contemplates the production of vinyl chloride using ethane, ethylene or mixtures thereof as starting materials. Still more particularly, this invention utilizes molten salt, which salt serves as catalyst, chlorine transfer medium, oxygen transfer medium, and heat transfer medium. Further, this invention contemplates the recovery, recycle, and ultimate conversion to vinyl chloride product, of unconverted ethane, ethylene, and the intermediate chlorinated compounds, such as, ethyl chloride and dichloroethane.

In the prior art, vinyl chloride is generally produced from ethylene and chlorine feeds. Chlorine is contacted with ethylene at temperatures of from about 100°F. to 300°F., perhaps in the presence of a catalyst to form a 1,2-dichloroethane intermediate. The dichloroethane intermediate is then dehydrochlorinated catalytically at a temperature of from about 700°F. to 1,000°F. to form vinyl chloride and hydrogen chloride.

Commercial feasibility of this method depends on the economic recovery of the hydrogen chloride which is produced. One technique is to react the hydrogen chloride with acetylene to produce vinyl chloride. Alternatively, the hydrogen chloride is used to produce more dichloroethane intermediate which is then dehydrochlorinated to produce vinyl chloride. According to this method, ethylene, hydrogen chloride and oxygen are contacted at about 500°F. to 700°F. over a copper chloride-based catalyst in either a fixed bed or fluidized bed reactor. The reaction is exothermic and, consequently, heat must be removed from the reaction apparatus.

Accordingly, an object of this invention is to provide a new and improved process for producing vinyl chloride.

Another object of this invention is to provide a process for producing vinyl chloride employing metallic chloride melts.

A further object of this invention is to provide a process for producing vinyl chloride which has a lower over all cost.

Still another object of this invention is to provide a new and improved reactor for producing vinyl chloride.

These and other objects of the invention should be more readily apparent from the following detailed description thereof when read with reference to the accompanying drawings wherein.

Figure 1:
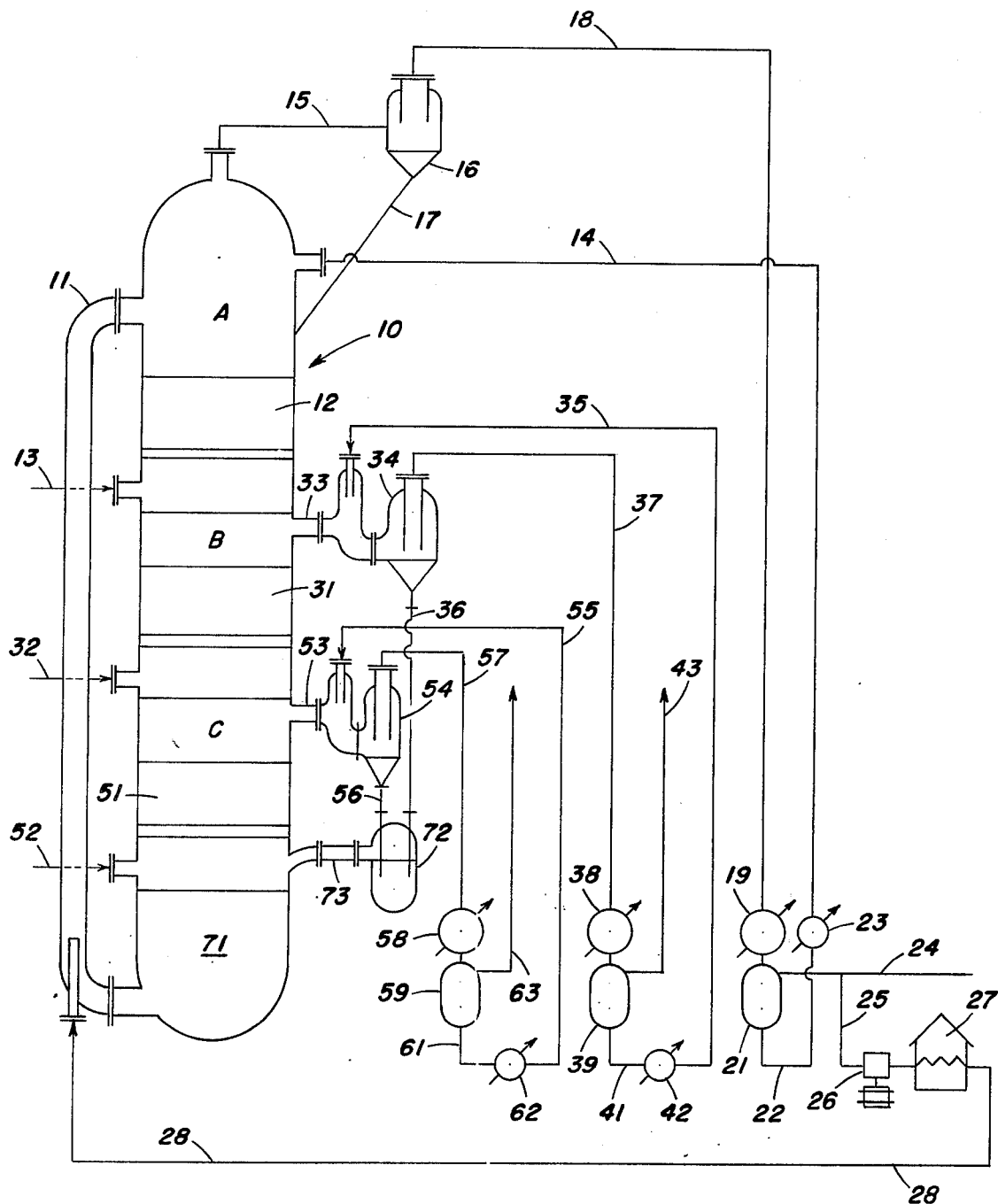
FIG. 1 illustrates an embodiment of the reactor system of the invention.

The objects of the invention are broadly accomplished by contacting a melt containing a multivalent metal chloride in its higher and lower valence state in a first reaction zone of a reactor with molecular oxygen to effect oxidation of the melt to produce the oxychloride of the multivalent metal. The oxidized melt, including the multivalent metal chloride in its higher and lower valence state and the oxychloride of the multivalent metal is passed to a second reaction zone in the reactor and contacted therein with ethane and/or ethylene and chlorine and/or hydrogen chloride to produce a gaseous effluent including vinyl chloride and dichloroethane as reaction products. The melt from the second reaction zone of the reactor is passed to a third reaction zone of the reactor and contacted therein with dichloroethane recovered from the effluent from the second reaction zone to effect dehydrochlorination of the dichloroethane to vinyl chloride. The melt withdrawn from the third reaction zone is recycled to the first reaction zone to effect the aforementioned oxidation thereof.

In the process, the overall reactions for the conversion of ethane and ethylene hydrocarbons to vinyl chloride with oxygen and chlorine and hydrogen chloride are represented by the following equations:

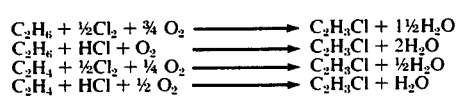

The introduction of oxygen into a molten chloride salt by contact between the salt and an oxygen-containing gas can be represented by Equation V for a copper chloride-containing molten salt system.

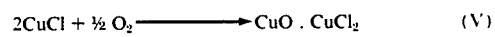

The primary reactions which occur in the process are represented by the following equations:

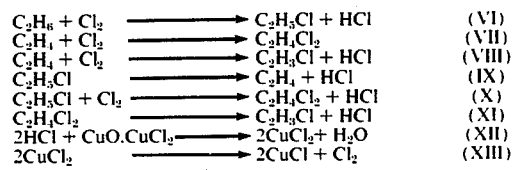

Thus, chlorine present in the feed and that effectively generated from the higher valent metal chloride in the molten salt, as represented by Equation XIII — said higher valent metal chloride represented in Equation XIII by $CuCl_2$ (cupric chloride) — chlorinate the ethane, ethylene and ethyl chloride with the concurrent production of hydrogen chloride as represented by Equation VI, VIII and X. Further, chlorinated hydrocarbons (ethyl chloride and dichloroethane) are dehydrochlorinated to form ethylene or a chlorinated hydrocarbon and concurrently hydrogen chloride as represented by Equations IX and XI. Said hydrogen chloride generated by such chlorination and dehydrochlorination reactions together with any hydrogen chloride feed, react with the metal oxychloride in the molten mass to form water and the higher valent metal chloride as represented by Equation XII - said metal oxychloride represented in Equation XII as $CuO \cdot CuCl_2$ (copper oxychloride). The higher valent metal chloride is reduced to the lower valence state concurrently releasing chlorine, as represented by Equation XIII, or through direct reaction with a hydrocarbon or a chlorinated hydrocarbon. Thus, the quantity of $CuCl_2$ remains essentially constant throughout the various reaction sequences.

While it is assumed that the foregoing explanation of the reactions and the equations set forth correctly describe the process of this invention, it is understood that other reactions may occur and applicant should not be bound or restricted by the aforementioned explanation.

It is seen from Equation I that for an ethane/chlorine fresh feed, stoichiometrically 0.5 moles of chlorine and 0.75 moles of oxygen are required. Thus, if the oxygen is conveyed in the molten halide salt as copper oxychloride ($CuO \cdot CuCl_2$), at least 1.5 moles of copper oxychloride are needed per mole of ethane feed. Further, the presence of ethylene in the ethane feed reduces the requirement of the metal oxychloride as can be seen from Equation III. Still further, the presence of hydrogen chloride in the chlorine feed increases the requirement for metal oxychloride as illustrated by Equations II and IV.

The melt contains a chloride of a multivalent metal; i.e., a metal having more than one positive valence state, such as manganese, iron, copper, cobalt, and chromium, preferably copper. In the case of higher melting multivalent metal chlorides, such as copper chlorides, a chloride of a univalent metal; i.e., a metal having only one positive valence state which is nonvolatile and resistant to the action of oxygen under the process conditions is added to the multivalent metal chloride to form a molten salt mixture having a reduced melting point. The univalent metal chlorides, are preferably alkali metal chlorides, such as potassium and lithium chloride in particular, but it is to be understood that other metal chlorides and mixtures thereof, such as the heavy metal chlorides of Groups I, II, III and IV of the Periodic Table; e.g., zinc, silver and thallium chloride, may also be employed. The univalent metal chlorides are generally added in an amount sufficient to adjust the melting point of the molten salt mixture to a temperature of below about 500°F., and in the case of a salt mixture of copper chloride and potassium chloride, the composition of the melt ranges between about 20% and about 40%, preferably about 30%, by weight, potassium chloride, with the remainder being copper chloride. It is to be understood, however, that in some cases the catalyst melt may have a melting point higher than 500°F., provided the catalyst remains in the form of the melt throughout the processing steps. It is further to be understood that the melt may contain a mixture of multivalent metal chlorides or other reaction promoters. It is also to be understood that in some cases, metal chloride may be maintained as a melt without the addition of a univalent metal halide.

The chlorination effected in the second zone and dehydrochlorination effected in the third zone are generally effected at temperatures from about 700°F. to about 1,200°F., although the temperatures may be as low as 575°F., and at pressures from about 1 to about 20 atmospheres. The contacting of the feed and melt is generally effected in a countercurrent fashion, preferably with the feed as a continuous vapor phase, at residence times from about 1 to about 60 seconds although longer residence times may be employed. In the first reaction zone wherein the melt is contacted with molecular oxygen, the temperature is generally from about 600°F. to about 900°F., although higher temperatures may be employed.

It should be apparent from the hereinabove noted reaction sequences, that the melt containing the multivalent metal chloride, in some cases, participates in the reaction sequences and accordingly does not behave only as a catalyst. Thus, for example, the melt functions to transfer oxygen and as should be apparent from the hereinabove noted equations sufficient oxychloride must be produced to provide the oxygen requirements for the reactions, such requirements being greater for ethane as compared to ethylene and greater for hydrogen chloride as compared to chlorine.

The melt, in addition to functioning as a reactant and/or catalyst is a temperature regulator. Thus, the circulating melt has a high heat absorption capacity thereby preventing runaway reaction during the exothermic chlorination and oxygen contacting steps. The absorbed heat of reaction may be employed to both heat the various reactants to reaction temperature and supply heat for the endothermic dehydrochlorination. It should be apparent, however, that if additional heating or cooling is required such heating or cooling may be supplied from an external source. It should also be apparent that the heat absorption capacity of the melt functions to maintain essentially isothermal conditions during the reaction.

The overall process of the invention is extremely effective for the production of vinyl chloride in that chlorinated intermediates are effectively converted to the desired vinyl chloride reaction product. Thus, the dichloroethane, primarily 1,2-dichloroethane, produced from the chlorination of ethane and/or ethylene is effectively converted to vinyl chloride by the use of the molten salts in accordance with the present invention. Thus, it has been found that the dehydrochlorination of dichloroethane in the presence of the molten salts provides high conversion of dichloroethane in addition to high selectivity to vinyl chloride.

The invention will now be described in further detail with reference to the accompanying drawings which illustrate embodiments of the invention.

Referring now to FIG. 1, there is provided a reaction vessel 10, divided into three zones A, B and C, which is hereinafter described in more detail with reference to FIG. 2. A molten chloride salt of the type hereinabove described, such as a mixture of copper chlorides and potassium chloride, at a temperature between about 600°F. and about 900°F., is introduced from a gas lift pipe 11 into the top of reaction zone A, provided with suitable packing 12 and maintained at a pressure between 1 and about 20 atmospheres. A compressed oxygen containing gas, such as air, is introduced from line 13 into the bottom of the reaction zone A and countercurrently contacts the molten salt. As a result of such contact, the molten salt is oxidized to produce oxides and oxychlorides with the concurrent evolution of heat. The contact residence time between the molten salt and the gas is generally between about 1 and about 60 seconds.

The effluent gas withdrawn from the packing 12 is at a temperature between about 600°F. and about 900°F., and is contacted with a spray of quench liquid introduced through line 14, at a temperature of about 105°F., to effect cooling of the gas and concurrent condensation and elimination of entrained and vaporized chloride salts. The quench liquid is vaporized as a result of such contact, and together with the effluent gas is withdrawn from the top of zone A through line 15. The gas in line 15 is introduced into a cyclone separator 16 to eliminate any solid material, which is returned to zone A through line 17. A solid-free gas is withdrawn from cyclone separator 16 through line 18, passed through condenser 19 to condense the quench liquid and introduced into a separator 21. The condensed portion is withdrawn from separator 21 through line 22, cooled in heat exchanger 23, and recycled through line 14 as the quench liquid for zone A. The still gaseous portion is withdrawn from the separator 21 through line 24 and a portion thereof passed through line 25 to a compressor 26. The compressed gas from compressor 26 is passed through furnace 27 wherein the gas is heated to a temperature between about 400°F. and about 1,000°F. and passed through line 28 to the lift pipe 11 to convey molten salt to the top of the reactor 10, as hereinafter described. The gas in lift pipe 11 may contain some oxygen or oxygen may be added thereto to initiate oxidation of the melt. The remaining portion of gas in line 24 may be purified, if necessary, with a caustic wash and passed to vent (not shown).

The oxidized molten salt from zone A flows into zone B, containing a suitable packing 31, which is maintained at a temperature of between about 700°F. and about 1,200°F. A feed gas, containing ethane and/or ethylene, chlorine and/or hydrogen chloride, possibly some ethyl chloride, dichloroethane and other chlorinated hydrocarbons is introduced into zone B through line 32. The components of the feed gas may be obtained either from an extraneous source or as recycle from the process. Although as shown in the drawing all the components of the feed are introduced together, it should be apparent that the various components could be introduced separately. The feed gas contacts the molten salt in zone B and as a result of such contact, chlorination, oxidation, dehydrochlorination and dehydrogenation, as hereinabove described, are concurrently effected. In addition, the hydrogen chloride both in the feed and generated in situ reacts with the molten metal oxides and oxychlorides to effect oxychlorination of the hydrocarbons and chlorinated hydrocarbons. A gaseous effluent is withdrawn from the top of zone B through line 33 and introduced into a combination quench-separator 34. The gaseous effluent is contacted with a quench liquid introduced through line 35, resulting in cooling of the gas, vaporization of the quench liquid and condensation of vaporized and entrained salts. The entrained salts are withdrawn from the separator 34 through line 36 for return to the reactor 10, as hereinafter described, and the gaseous stream containing vaporized quench liquid and effluent gas, is withdrawn therefrom through line 37. The combined gas in line 37 is passed through condenser 38 to effect condensation of the quench liquid and the gas-liquid mixture introduced into a separator 39. The quench liquid is withdrawn from separator 39 through line 41, passed through cooler 42 and recycled to quench-separator 34 through line 35. The reaction effluent, containing primarily vinyl chloride, ethylene, ethyl chloride, dichloroethane, water, hydrogen chloride and unconverted ethane, is withdrawn from separator 39 through line 43 and passed to a recovery zone which may be of a type described in detail in application Ser. No. 614,338, filed Feb. 6, 1967, now abandoned, and hereby incorporated by reference. The ethylene, ethyl chloride, ethane and hydrogen chloride recovered from the effluent is preferably recycled to zone B.

The molten salt from zone B, now essentially free of oxides and oxychlorides, flows into zone C, containing a suitable packing 51 and maintained at a temperature between about 700°F. and about 1,200°F. A feed gas, primarily containing dichloroethane and generally obtained as recycle from the separation zone (not shown), is introduced into zone C through line 52. The dichloroethane contacts the molten salt and as a result of such contact, the dichloroethane is dehydrochlorinated to produce vinyl chloride and hydrogen chloride. The contact time is generally between about 1 and about 60 seconds.

A gaseous effluent is withdrawn from the top of zone C through line 53 and introduced into a combination quench-separator 54. The gaseous effluent is contacted with a quench liquid introduced through line 55, resulting in cooling of the gas, vaporization of the quench liquid and condensation of vaporized and entrained salts. The entrained salts are withdrawn from the separator 54 through line 56 for return to the reactor 10, as hereinafter described, and the gas stream, containing vaporized quench liquid and effluent gas is withdrawn therefrom through line 57. The combined gas in line 57 is passed through condenser 58 to effect condensation of the quench liquid and the gas-liquid mixture introduced into a separator 59. The quench liquid is withdrawn from separator 59 through line 61, passed through cooler 62 and recycled to quench-separator 54 through line 55. The reactor effluent is withdrawn from separator 59 through line 63 and passed to a separation and recovery zone (not shown).

The molten salt, now containing equilibrium amounts of higher and lower valency metal chlorides from zone C, flows into a sump 71 located at the bottom of the reactor 10. The solid salts recovered from zones B and C in lines 36 and 56, respectively, are introduced into a tank 72 containing a heating element (not shown) wherein the salt is remelted. The now molten salt is withdrawn from tank 72 through line 73 and introduced into the sump 71. The molten salt flows from the sump 71 into the bottom of the lift pipe 11 and is carried to the top thereof for introduction into zone A by the lift gas introduced through line 28. The temperature of the molten salts introduced into the zone A may be controlled by appropriately regulating the temperature of the lift gas introduced into lift pipe 11 through line 28, the lift gas being at a temperature which is either higher or lower than the temperature of the melt withdrawn from zone C to effect either heating or cooling of the melt, as required, with the temperature of the lift gas being higher than the solidification temperature of the melt.

Figure 2:
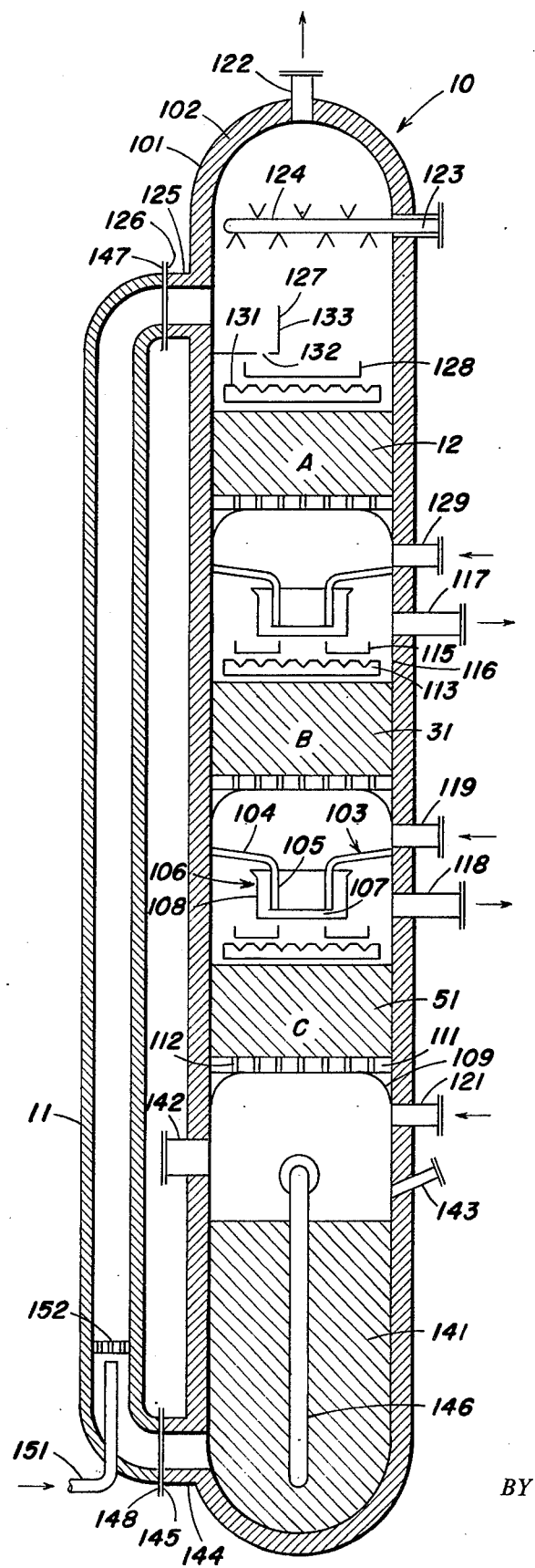
FIG. 2 illustrates an embodiment of the reactor of the invention.

Referring now to FIG. 2, there is shown the reactor 10, comprised of a cylindrical shaped outer metal shell 101, the interior of which is coated with an impermeable membrane layer (not shown) which is covered with suitable ceramic material 102. The reactor 10 is divided into three zones A, B and C by two axially spaced seal systems, generally indicated as 103. The seal system 103 is comprised of a horizontally positioned annular, impermeable ceramic arched plate or section 104, which is an extension of the ceramic liner 102, having an open downwardly-extending cylindrical portion 105, extending into a cylindrical ceramic container 106 and terminating short of the bottom thereof, thereby forming a passage 107. The upwardly-extending wall 108 of the container 106 terminates short of the bottom surface of the section 104 permitting fluid to flow over the rim of container 106. The container 106 is supported by a plurality of circumferentially spaced ceramic arches (not shown) which extend from the ceramic lining 102 of the reactor 10.

Each of the reaction zones A, B and C is provided with a circular ceramic grill 111, (supported by a ceramic arch 109) containing a plurality of openings 112, the grill functioning to both support a suitable packing, schematically represented as 12, 31 and 51 in zones A, B and C, respectively, and distributing fluid in the zone. Each of the zones A, B and C is also provided with a circular ceramic liquid distributing device 113, supported immediately above the arching in each section by a plurality of circumferentially spaced ceramic arches (not shown) which extend from the ceramic lining 102. The zones B and C are further provided with an annular ceramic liquid collection box 115, supported by a plurality of circumferentially spaced ceramic arches (not shown), extending from the liner 102, the box 115 being positioned between the distributing device 113 and the container 106. The outer diameter of the collection box 115 is greater than the diameter of the container 106 and, therefore, receives fluid which overflows therefrom. The zones B and C are also provided at the upper portion thereof with outlet pipes 117 and 118, respectively, and at the lower portions thereof with inlet pipes 119 and 121, respectively.

The zone A is provided at the top thereof with a fluid output pipe 122 and a horizontally positioned quench liquid inlet pipe 123, containing a plurality of spray openings 124 therein. The zone A is further provided with: a fluid inlet pipe 125, containing an outwardly extending flange 126 for connection to a gas lift pipe, as hereinafter described; a ceramic liquid metering box 127; a circular ceramic liquid collection box 128, all positioned above the packing 12; and inlet pipe 129 positioned below the packing 12. The metering box 127 is supported by a ceramic arch (not shown) extending from the liner 102 immediately below inlet pipe 125 and is provided with a slot 132 and an upwardly extending wall 133, the upper edge of which is opposite the central portion of the feed pipe 125 and spaced therefrom. The metering box is provided with suitable metering apparatus (not shown). The collection box 128 is positioned below the metering box 127 and a portion thereof extends beyond the outer wall of the metering box 127 so that fluid flowing through the slot 132 will fall into the collection box 128 and from there to the distributing device 113 and the packing 12. Similarly to the collection box 115, in zones B and C, the collection box 128 is supported by a plurality of circumferentially spaced ceramic arches extending from the liner 102.

The portion of the reactor 10 below the inlet pipe 121 of zone C forms a sump 141 and is provided with a fill pipe 142 for introducing initial molten salt material and any necessary additional material, an inlet pipe 143 at the upper portion thereof for introducing recycled melt, an outlet pipe 144, provided with an outwardly extending flange 145 and a heating element 146 for providing any necessary heat make-up. A U-shaped ceramic lined lift pipe 11, is connected to the flange 126 of inlet pipe 125 through an outwardly extending flange 147 and to the flange 145 of outlet pipe 144 through an outwardly extending flange 148, thereby placing the sump 141 in fluid flow communication with zone A. The lower portion of the lift pipe 11 is provided with a gas inlet tube 151 and a distributor 152.

The reactor 10 is employed in the process hereinabove described with respect to FIG. 1, with outlet pipe 122 being connected to line 15, liquid inlet pipe 125 to line 11, inlet pipe 129 to line 13, outlet pipe 117 to line 33, inlet pipe 119 to line 32, inlet pipe 121 to line 52, outlet pipe 118 to line 53, inlet pipe 143 to line 73, and gas inlet pipe 151 to line 28.

The seal system 103 permits melt to flow from one zone to another and prevents any gas flow between the zones. Thus, the containers 106 are maintained filled with melt and the melt passes from one zone to another by overflowing the container 106 into the collection box 115 and from the collection box 115 to the liquid distributor device 113. The melt is distributed over the packing and contacted therein by the gas introduced into the lower portion of the zone. The liquid metering box 127 in zone A functions primarily to measure the rate of liquid flow being introduced through inlet pipe 125.

The reactor hereinabove described with reference to FIG. 2 may be modified in numerous ways within the spirit and scope of the invention. It is also to be understood that although the reactor is particularly adapted for use in a reaction system such as described with reference to FIG. 1, the reactor may also be employed in other reaction systems and thus the use thereof is not limited to the production of vinyl chloride.

The invention is further illustrated by the following Example but the scope of the invention is not to be limited thereby.

EXAMPLE 1

A melt containing 30% potassium chloride and 70% copper chlorides, all by weight, is employed in reactor vessel 10, with zone A at average conditions of 867°F. and 137 psia, zone B at an average of 883°F. and 143 psia, and zone C at an average of 864°F. and 147 psia. Air is introduced into zone A. The feed to zone C consists mainly of dichloroethane. The feed to zone B has the following composition:

| Component | Mole % |
|---|---|
| $C_2H_6$ | 60 |
| $C_2H_4$ | 14 |
| $Cl_2$ | 14 |
| HCl | 7 |
| $C_2H_5Cl$ | 5 |
| | 100 |

The following process conditions are employed:

| Line (FIG. 1) | Temperature, °F. | Flow Rate, lbs./hr. (Based upon 200 million lbs./yr. vinyl chloride product |
|---|---|---|
| 11 | 845 | 1,816,000 |
| 13 | 70 | 53,700 |
| 14 | 105 | 12,260 |
| 28 | 600 | 40,030 |
| 32 | 100 | 54,680 |
| 33 | 886 | 69,420 |
| 52 | 100 | 17,450 |
| 53 | 880 | 17,450 |

The effluent from zone B, stream 33, has the following composition:

| Component | Mole % |
|---|---|
| $CO_2$ | 0.3 |
| $H_2O$ | 37.7 |

-Continued

| Component | Mole % |
|---|---|
| $C_2H_6$ | 23.4 |
| $C_2H_4$ | 10.8 |
| $C_2H_3Cl$ | 16.4 |
| $C_2H_5Cl$ | 3.8 |
| $C_2H_4Cl_2$ | 5.9 |
| $C_2H_2Cl_2$ | 0.7 |
| $C_2H_3Cl_3$ | 0.2 |
| $C_2HCl_3$ | 0.3 |
| $C_2Cl_4$ | 0.5 |
| | 100.0 |

The effluent from zone C, stream 53, has the following composition:

| Component | Mole % |
|---|---|
| $C_2H_4$ | 1.1 |
| HCl | 36.2 |
| $C_2H_3Cl$ | 36.3 |
| $C_2H_4Cl_2$ | 25.0 |
| $C_2H_2Cl_2$ | 0.4 |
| $C_2H_3Cl_3$ | 0.8 |
| $C_2Cl_4$ | 0.2 |
| | 100.0 |

EXAMPLE II

The procedure of Example I is repeated using the following salt composition and a temperature of 920°F. and a residence time of 7 seconds in all three zones:

| KCl | 34 |
|---|---|
| $FeCl_2$ | 58 |
| $FeCl_3$ | 8 |
| | 100 |

The effluents from both zones B and C contain vinyl chloride.

EXAMPLE III

The procedure of Example I is repeated using the following salt composition and a temperature of 890°F. and a residence time of 13 seconds in all three zones:

| LiCl | 30 |
|---|---|
| CuCl | 50 |
| $CuCl_2$ | 20 |
| | 100 |

The effluents from both zones B and C contain vinyl chloride.

EXAMPLE IV

The procedure of Example I is repeated using the following salt composition and a temperature of 930°F. and a residence time of 6 seconds in all three zones:

| KCl | 17 |
|---|---|
| $MnCl_2$ | 3 |
| $MnCl_3$ | 80 |
| | 100 |

The effluents from zones B and C contain vinyl chloride.

EXAMPLE V

The procedure of Example I is repeated using the following salt composition and a temperature of 920°F. and a residence time of 7 seconds in all three zones:

| KCl | 21 |
|---|---|
| $CrCl_2$ | 5 |
| $CrCl_3$ | 74 |
| | 100 |

The effluents from both zones B and C contain vinyl chloride.

EXAMPLE VI

The procedure of Example I is repeated using the following salt composition and a temperature of 930°F. and a residence time of 6 seconds in all three zones:

| KCl | 37 |
|---|---|
| $CoCl_2$ | 14 |
| $CoCl_3$ | 49 |
| | 100 |

The effluents from both zones B and C contain vinyl chloride.

EXAMPLE VII

This example illustrates the improved results obtained by using a molten salt, as opposed to a supported solid salt, for the dehydrochlorination of dichloroethane.

A. A composition comprising 20 weight percent cupric chloride and 80 weight percent cuprous chloride was placed on a finely divided alumina support (−100 + 200 mesh) and the supported catalyst placed in a fluidized reactor. 1,2-dichloroethane was passed through the fluidized supported catalyst at a temperature of 880°F. and a residence time of 11 seconds.

The conversion of 1,2-dichloroethane was 42.4%; the selectivity to vinyl chloride was 87.6%.

B. A composition comprising 20 weight percent cupric chloride and 80 weight percent cuprous chloride combined with potassium chloride to provide a composition which contains 30 weight percent potassium chloride and the composition was placed on a finely divided alumina support (−100 + 200 mesh). The supported catalyst was placed in a fluidized reactor. 1,2-dichloroethane was passed through the fluidized supported catalyst at a temperature of 880°F. and a residence time of 11.5 seconds.

The conversion of 1,2-dichloroethane was 49.6%; the selectivity to vinyl chloride was 83.8%.

C. A composition comprising 20 weight percent cupric chloride and 80 weight percent cuprous chloride was formed into a melt by the addition of potassium chloride, the potassium chloride being 30 weight percent of the melt. 1,2-dichloroethane was circulated through a reactor in contact with the melt at a temperature of 881°F. and a residence time of 10 seconds.

The conversion of 1,2-dichloroethane was 92.4% and the selectivity to vinyl chloride was 97.8%.

The herein above example illustrates that dehydrochlorination as effected in the present invention results in high vinyl chloride selectivity in combination with high rates of conversion.

The present invention is particularly advantageous in that a high yield of vinyl chloride can be produced using either ethylene, ethane or mixtures thereof. A further advantage of the present invention is that unreacted feed and intermediate reaction products, including hydrogen chloride, ethylene, ethyl chloride and dichloroethane can be effectively converted to the desired vinyl chloride product. Moreover, dichloroethane intermediate product is converted to vinyl chloride at high conversion rates and high vinyl chloride selectivity.

Numerous modifications and variations of the present invention are possible in light of the above teachings and, therefore, within the scope of the appended claims, the invention may be practised in a manner other than as particularly described.

What is claimed is:

1. A continuous process for producing vinyl chloride, comprising:
   a. introducing a melt containing a multivalent metal chloride into a first reaction zone positioned in the top portion of a reactor;
   b. introducing molecular oxygen into the first reaction zone, said oxygen contacting the melt to effect oxidation thereof and produce the oxychloride of the metal;
   c. passing the melt, by gravity, from the first reaction zone into a second reaction zone positioned in the intermediate portion of the reactor;
   d. introducing a gaseous member selected from the group consisting of chlorine, hydrogen chloride and mixtures thereof and a gaseous member selected from the group consisting of ethane, ethylene and mixtures thereof into the second reaction zone to contact said melt to produce a first gaseous effluent containing vinyl chloride and dichloroethane;
   e. withdrawing the first gaseous effluent from the second reaction zone and recovering vinyl chloride and dichloroethane therefrom;
   f. withdrawing the melt from the second reaction zone and passing the melt, by gravity, into a third reaction zone positioned in the bottom of the reactor;
   g. introducing dichloroethane recovered in step (e) into the third reaction zone, said dichloroethane contacting the melt to produce a second gaseous effluent containing vinyl chloride;
   h. withdrawing the second gaseous effluent from the third reaction zone and recovering vinyl chloride therefrom; and
   i. passing melt withdrawn from the third reaction zone to step (a).

2. The process as defined in claim 1 wherein the multivalent metal is selected from the group consisting of copper, chromium, manganese, iron and cobalt.

3. The process as defined in claim 2 wherein the first reaction zone is maintained at a temperature from about 600°F. to about 900°F. and the second and third reaction zones are maintained at a temperature from about 700°F. to about 1200°F.

4. The process as defined in claim 3 wherein the melt further includes as a melting point depressant a member selected from the group consisting of alkali metal chlorides and the heavy metal chlorides of Groups I, II, III and IV of the Periodic Table.

5. The process as defined in claim 4 wherein the melting point depressant is an alkali metal chloride.

6. The process as defined in claim 4 wherein the multivalent metal is copper.

7. The process as defined in claim 4 wherein the melt in step (i) is passed to step (a) by a lift gas.

8. The process as defined in claim 7 wherein the lift gas is at an elevated temperature and employed to regulate the temperature of the melt.

9. A continuous process for producing vinyl chloride, comprising:
   a. introducing a melt containing cuprous and cupric chloride and potassium chloride into a first reaction zone positioned in the top portion of a reactor;
   b. introducing molecular oxygen into the first reaction zone, said oxygen contacting the melt to effect oxidation thereof and produce copper oxychloride;
   c. passing the melt, by gravity, from the first reaction zone into a second reaction zone positioned in the intermediate portion of the reactor;
   d. introducing a gaseous member selected from the group consisting of chlorine, hydrogen chloride and mixtures thereof and a gaseous member selected from the group consisting of ethane, ethylene and mixtures thereof into the second reaction zone to contact said melt to produce a first gaseous effluent containing vinyl chloride and dichloroethane;
   e. withdrawing the first gaseous effluent from the second reaction zone and recovering vinyl chloride and dichloroethane therefrom;
   f. withdrawing the melt from the second reaction zone and passing the melt, by gravity, into a third reaction zone positioned in the bottom of the reactor;
   g. introducing dichloroethane recovered in step (e) into the third reaction zone, said dichloroethane contacting the melt to produce a second gaseous effluent containing vinyl chloride;
   h. withdrawing the second gaseous effluent from the third reaction zone and recovering vinyl chloride therefrom; and
   i. passing melt withdrawn from the third reaction zone to step (a).

10. The process as defined in claim 9 wherein the melt in step (a) contains from about 20 to about 40%, by weight, of potassium chloride, with the remainder being copper chloride based on the three components.

11. The process as defined in claim 10 wherein the first reaction zone is maintained at a temperature from about 600°F. to about 900°F. and the second and third reaction zones are maintained at a temperature from about 700°F. to about 1,200°F.

12. The process as defined in claim 11 wherein the first gaseous effluent further includes, ethane, ethylene and ethyl chloride, the, ethane, ethylene and ethyl chloride being recovered from the first gaseous effluent and recycled to the second reaction zone.

13. The process as defined in claim 11 wherein the melt in step (i) is passed to step (a) by an inert lift gas.

14. The process as defined in claim 13 wherein the inert lift gas is at an elevated temperature to supply make-up heat to the melt.

* * * * *